United States Patent
Feng

(10) Patent No.: US 11,374,607 B1
(45) Date of Patent: Jun. 28, 2022

(54) PROTECTIVE CASE FOR MOBILE TERMINAL

(71) Applicant: Shenzhen Yinhao Technology Co., Ltd., Shenzhen (CN)

(72) Inventor: Mou Feng, Yangjiang (CN)

(73) Assignee: Shenzhen Yinhao Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/564,238

(22) Filed: Dec. 29, 2021

(30) Foreign Application Priority Data

Oct. 26, 2021 (CN) .......................... 202122590820.9

(51) Int. Cl.
*H04B 1/3888* (2015.01)
*H04M 1/06* (2006.01)
*A45C 11/00* (2006.01)

(52) U.S. Cl.
CPC ............ *H04B 1/3888* (2013.01); *H04M 1/06* (2013.01); *A45C 2011/002* (2013.01)

(58) Field of Classification Search
CPC .......... H04B 1/3888; H04B 2001/3861; A45C 2011/002; H04M 1/06
See application file for complete search history.

(56) References Cited

U.S. PATENT DOCUMENTS

| 10,039,976 | B2 | 8/2018 | Kim |
| 10,594,352 | B2 | 3/2020 | Shin |
| 11,152,658 | B2 | 10/2021 | Lei |
| 2021/0046885 | A1* | 2/2021 | Jankura .................... B62J 11/00 |

FOREIGN PATENT DOCUMENTS

KR          2018077981 A  *  7/2018  ............. A45C 11/00

* cited by examiner

*Primary Examiner* — Keith Ferguson
(74) *Attorney, Agent, or Firm* — Benjamin H. B. Sley

(57) ABSTRACT

A protective case for a mobile terminal, includes a shell and a ring assembly, the shell is defined with a mounting chamber for accommodating the mobile terminal, the ring assembly includes a metal ring and a mounting portion, the mounting portion is fixed on the shell, the metal ring is arranged on a side of the shell opposite to the mounting chamber, the metal ring is pivotally connected with the mounting portion through a fixing shaft, the metal ring and the fixing shaft are jointly formed into an annular body, and a nick is defined on the annular body. As the mounting portion is fixed on the shell, the metal ring is arranged on the side of the shell opposite to the mounting chamber, and the metal ring is pivotally connected with the mounting portion through the fixing shaft, the metal ring can hence be firmly connected with the shell.

9 Claims, 5 Drawing Sheets

PROTECTIVE CASE FOR MOBILE TERMINAL

CROSS REFERENCE TO RELATED APPLICATION(S)

This patent application claims the benefit and priority of Chinese Patent Application No. 202122590820.9 filed on Oct. 26, 2020, the disclosure of which is incorporated by reference herein in its entirety as part of the present application.

TECHNICAL FIELD

The present disclosure relates to the technical field of mobile phone accessories, and in particular, to a protective case for a mobile terminal.

BACKGROUND

In the technical field of mobile phone accessories, there is an increasing demand for ring holders since they can serve as mobile phone holders and provide much convenience for users. However, after long-term use, a ring holder usually shows poor adhesion, drops easily due to reduced viscosity and even leaves glue on the surface of the mobile phone shell. Meanwhile, the folded ring holder is formed into an enclosed annular conductor and consequently generates an interferential electromagnetic field, affecting wireless charging of the cased mobile phone.

SUMMARY

In view of the technical problems that the ring holder after long-term use adheres infirmly and drops easily for the reduced viscosity and even remains the glue on the surface of the mobile phone shell, and the folded ring holder is formed into an enclosed annular conductor and consequently generates an interferential electromagnetic field to affect wireless charging of the cased mobile phone in the prior art, the present disclosure provides a protective case for a mobile terminal.

In order to solve the above technical problems, the present disclosure employs the following technical solutions:

A protective case for a mobile terminal includes a shell and a ring assembly, the shell is defined with a mounting chamber for accommodating the mobile terminal;

the ring assembly includes a metal ring and a mounting portion, the mounting portion is fixed on the shell, the metal ring is arranged on a side of the shell opposite to the mounting chamber, and the metal ring is pivotally connected with the mounting portion through a fixing shaft; and the metal ring and the fixing shaft are jointly formed into an annular body, and a nick is defined on the annular body.

Further, the protective case may have a maximum thickness of less than or equal to 4.8 mm, and the maximum thickness may specifically refer to a distance between a bottom of the mounting chamber and a top of the ring assembly.

Further, when the metal ring rotates to a position attached with the shell, the metal ring may surround the mounting portion; the mounting portion may be rotatably connected with the shell; and the mounting portion can rotate relative to the shell around a first straight line, such that the metal ring can rotate relative to the shell around the first straight line, the first straight line being perpendicular to a backside of the shell.

Further, a first through hole may be formed in the shell, the mounting portion may include a base, a fixing cover and a rotary ring, the base may be located in the mounting chamber, the fixing cover may be located on the backside of the shell, the base may be provided with a first extended portion, the fixing cover may be provided with a second extended portion, and the first extended portion may pass through the first through hole to be fixedly connected with the second extended portion so as to form a connecting post;

the rotary ring may be located between the shell and the fixing cover, the rotary ring may be sleeved on the connecting post and rotatably connected with the connecting post, and the shell and the rotary ring may be clamped between the base and the fixing cover; and the metal ring may be connected to an outer edge of the rotary ring, an inner edge of the metal ring may be matched with the outer edge of the rotary ring in shape, and the metal ring may rotate relative to the rotary ring for unfolding.

Further, the mounting portion may further include a wear ring, the wear ring may be sleeved on the connecting post and rotatably connected with the connecting post, the wear ring may be provided between the base and the fixing cover, and the rotary ring may be sleeved outside the wear ring and rotatably connected with the wear ring.

Further, the wear ring may be sleeved on the second extended portion and rotatably connected with the second extended portion.

Further, the rotary ring may include a groove with a second through hole defined on a bottom of the groove, the rotary ring may be sleeved on the connecting post through the second through hole and rotatably connected with the connecting post, and the fixing cover may be located in the groove.

Further, a side of the base abutting against the rotary ring may be provided with an annular groove, and a side of the rotary ring abutting against the base may be provided with an annular protrusion matched with the annular groove.

Further, a shielding layer may be provided on a top of the fixing cover.

Further, a lug may be provided at the outer edge of the rotary ring; two ends of the lug may be respectively defined with a first blind hole and a limiting post; the lug, the fixing shaft and the limiting post may be located at the nick; two end surfaces of the metal ring may be respectively defined with a second blind hole and a third blind hole; two ends of the fixing shaft may be respectively inserted into the first blind hole and the second blind hole; and an end of the limiting post away from the lug may be inserted into the third blind hole.

Compared with the prior art, as the mounting portion is fixed on the shell, the metal ring is arranged on the side of the shell opposite to the mounting chamber, and the metal ring is pivotally connected with the mounting portion through the fixing shaft, the metal ring can hence be firmly connected with the shell, thus solving the technical problem that the ring holder (namely the ring assembly) after long-term use adheres infirmly and drops easily for the reduced viscosity and even remains the glue on the surface of the mobile phone shell in the prior art; and meanwhile, as the nick is defined on the annular body jointly formed by the metal ring and the fixing shaft, the folded ring holder neither forms the enclosed annular conductor nor generates the interferential electromagnetic field to affect the charging, meeting the requirements of the wireless charging on the cased mobile phone; and moreover, the assembled ring assembly is structured compactly, and can meet the thickness requirement of the wireless charging with the axial thickness of less than or equal to 4.8 mm, thereby solving the technical problem that the folded ring holder (namely the ring assembly) is too thick to perform the wireless charging on the cased mobile phone in the prior art.

According to the protective case of the present disclosure, as the ring assembly includes the rotary ring, the user can rotate the rotary ring to a designated position according to own needs.

According to the protective case of the present disclosure, as the ring assembly includes the wear ring, the direct contact between the rotary ring and the connecting post is avoided; and with the wear ring, the rotary ring rotates more smoothly.

According to the protective case of the present disclosure, as the rotary ring includes the groove with the second through hole defined on the bottom of the groove and used for accommodating the fixing cover, the protective case reduces the thickness of the ring assembly, with the compact structure.

According to the protective case of the present disclosure, through the technical solution in which the side of the base abutting against the rotary ring is defined with the annular groove, and the side of the rotary ring abutting against the base is defined with the annular protrusion matched with the annular groove, the rotary ring rotates more smoothly.

Figure 1:
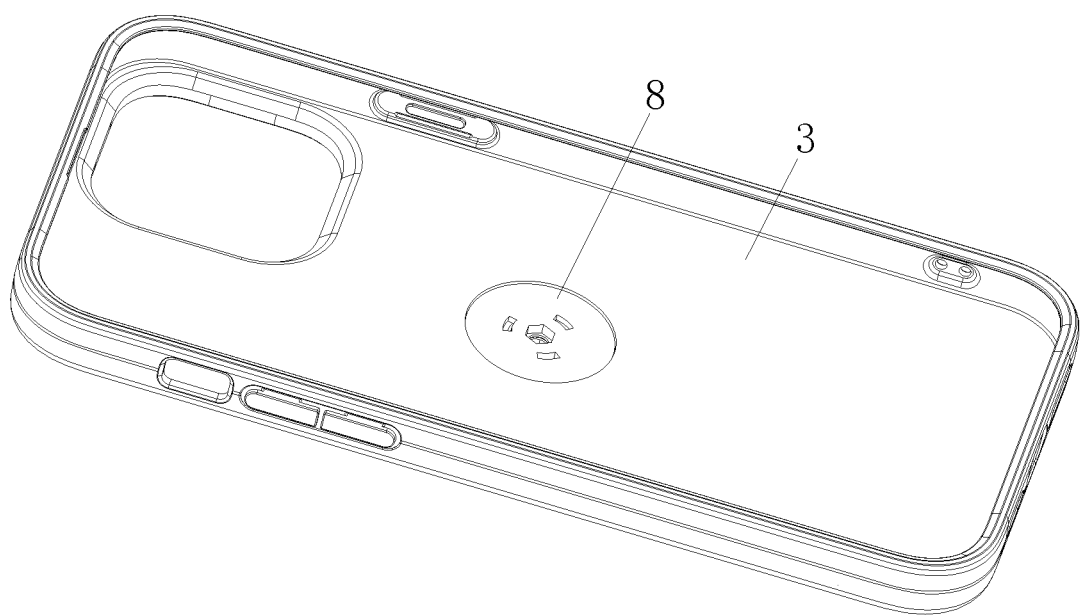
FIG. 1 illustrates a front view of a protective case of a mobile terminal according to the present disclosure.

In the figures: 1—shell, 2—ring assembly, 3—mounting chamber, 4—metal ring, 5—fixing shaft, 6—nick, 7—first through hole, 8—base, 9—fixing cover, 10—rotary ring, 11—first extended portion, 12—second extended portion, 13—wear ring, 14—second through hole, 15—groove, 16—annular groove, 17—annular protrusion, 18—shielding layer, 19—third through hole, 20—lug, 21—first blind hole, 22—limiting post, and 23—third blind hole.

DETAILED DESCRIPTION OF THE EMBODIMENTS

To make the technical means, creative features, purposes of use and effects of the present disclosure comprehensible, the present disclosure is further described blow with reference to the specific implementations.

In the description of the present disclosure, it should be understood that orientations or position relationships indicated by terms "longitudinal", "radial", "length", "width", "thickness", "upper", "lower", "front", "rear", "left", "right", "vertical", "horizontal", "top", "bottom", "inside", "outside", and the like are orientations or position relationships as shown in the drawings, for ease of describing the present disclosure and simplifying the description, rather than indicating or implying that the mentioned devices or elements must have a specific orientation and must be established and operated in a specific orientation, and thus, these terms cannot be understood as a limitation to the present disclosure. In the description of the present disclosure, unless otherwise specified, "a plurality of" means at least two.

In the description of the present disclosure, it should be noted that, unless otherwise clearly specified, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. A person of ordinary skill in the art may understand specific meanings of the foregoing terms in the present disclosure based on a specific situation.

Referring to FIG. 1 to FIG. 5, the embodiment of the present disclosure provides a protective case for a mobile terminal, including a shell 1 and a ring assembly 2, the shell 1 is defined with a mounting chamber 3 for accommodating the mobile terminal; the ring assembly 2 includes a metal ring 4 and a mounting portion, the mounting portion is fixed on the shell 1, the metal ring 4 is arranged on a side of the shell 1 opposite to the mounting chamber 3, and the metal ring 4 is pivotally connected with the mounting portion through a fixing shaft 5; and the metal ring 4 and the fixing shaft 5 are jointly formed into an annular body, and a nick 6 is defined on the annular body.

As a specific embodiment, the mobile terminal may be a mobile phone, a tablet computer, etc. The protective case has a maximum thickness of less than or equal to 4.8 mm, and the maximum thickness specifically refers to a distance between a bottom of the mounting chamber 3 and a top of the ring assembly 2.

As a specific embodiment, when the metal ring 4 rotates to a position attached with the shell, the metal ring surrounds the mounting portion; the mounting portion is rotatably connected with the shell 1; and the mounting portion can rotate relative to the shell 1 around a first straight line, such that the metal ring 4 can rotate relative to the shell 1 around the first straight line, the first straight line being perpendicular to a backside of the shell 1.

As a specific embodiment, a first through hole 7 is formed in the shell 1, the mounting portion includes a base 8, a fixing cover 9 and a rotary ring 10, the base 8 is located in the mounting chamber 3, the fixing cover 9 is located on the backside of the shell 1, the base 8 is defined with a first extended portion 11, the fixing cover 9 is defined with a second extended portion 12, and the first extended portion 11 passes through the first through hole 7 to be fixedly connected with the second extended portion 12 so as to form a connecting post; the rotary ring 10 is located between the shell 1 and the fixing cover 9, the rotary ring 10 is sleeved on the connecting post and rotatably connected with the connecting post, and the shell 1 and the rotary ring 10 are clamped between the base 8 and the fixing cover 9; and the metal ring 4 is connected to an outer edge of the rotary ring 10, an inner edge of the metal ring 4 is matched with the outer edge of the rotary ring 10 in shape, and the metal ring 4 may rotate relative to the rotary ring 10 for unfolding.

In the embodiment, the first through hole 7 is preferably a circular hole, and the first through hole 7 is preferably located on a middle position of the shell 1. The connecting post is an irregular post. The connecting post is composed of the first extended portion 11 and the second extended portion 12. The first extended portion 11 and the second extended portion 12 may be understood as two connectors. The first extended portion 11 and the second extended portion 12 may be detachably connected, and may be connected by rotating and clamping.

In the embodiment, as components from the base 8 contacting the mobile phone to the fixing cover 9 contacting the wireless charger are made of nonmetal materials, the wireless charging of the cased mobile phone is not affected.

According to the embodiment of the present disclosure, the mobile phone is put into the mounting chamber 3, the user holds the shell 1 and rotates the rotary ring 10 to any angle within 0-360° according to own needs, and thus the mobile phone is inserted into the metal ring 4 and does not drop easily. For a rotary connecting mechanism in which the rotary ring 10 is sleeved on the connecting post, a damping mechanism may be provided, such that when there is no external force or a small external force, the rotary ring 10 rotating to the designated angle can keep unchanged. When the cased mobile phone is charged wirelessly, the metal ring 4 is folded to expose the top of the fixing cover 9, and the top of the fixing cover 9 is put onto the charging inductive surface of the wireless charger, thus implementing the wireless charging on the cased mobile phone.

A groove for accommodating the base 8 may be formed in the mounting chamber 3; and after the base 8 is placed into the groove, the bottom of the base 8 is flush with the circumferential plane of the groove.

According to the protective case disclosed in the embodiment of the present disclosure, as the mounting portion is fixed on the shell, the metal ring is arranged on the side of the shell opposite to the mounting chamber, and the metal ring is pivotally connected with the mounting portion through the fixing shaft, such that the metal ring can be firmly connected with the shell, thus solving the technical problem that the ring holder (namely the ring assembly) after long-term use adheres infirmly and drops easily due the reduced viscosity and even remains the glue on the surface of the mobile phone shell in the prior art; and meanwhile, as the nick is defined on the annular body jointly formed by the metal ring and the fixing shaft, the folded ring holder neither forms the enclosed annular conductor nor generates the interferential electromagnetic field to affect the charging, meeting the requirements of the wireless charging on the cased mobile phone; and moreover, the assembled ring assembly is structured compactly, and can meet the thickness requirement of the wireless charging with the axial thickness of less than or equal to 4.8 mm, thereby solving the technical problem that the folded ring holder (namely the ring assembly) is too thick to perform the wireless charging on the cased mobile phone in the prior art.

Figure 3:
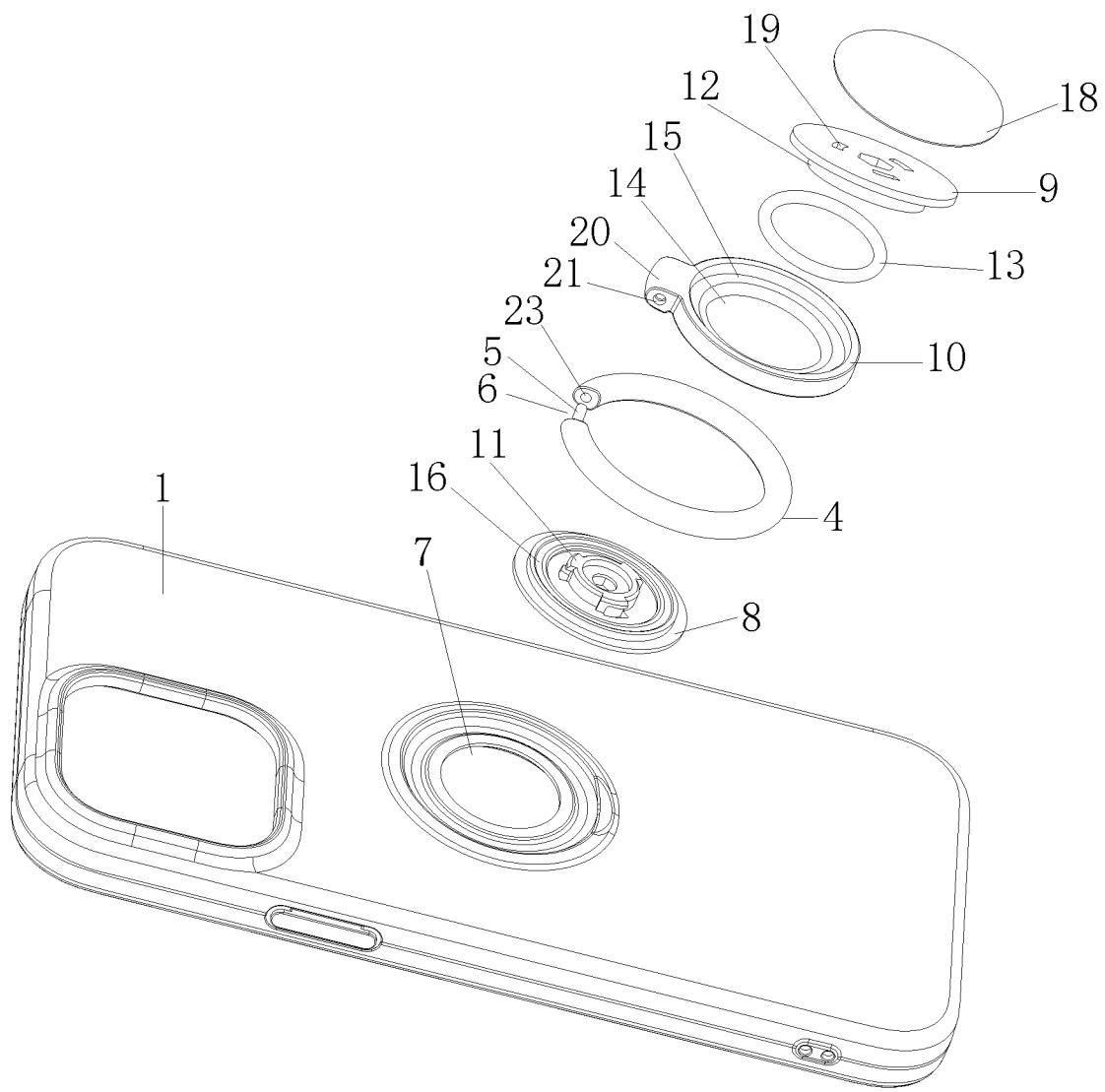
FIG. 3 illustrates an exploded view of a protective case of a mobile terminal according to the present disclosure.
Figure 4:
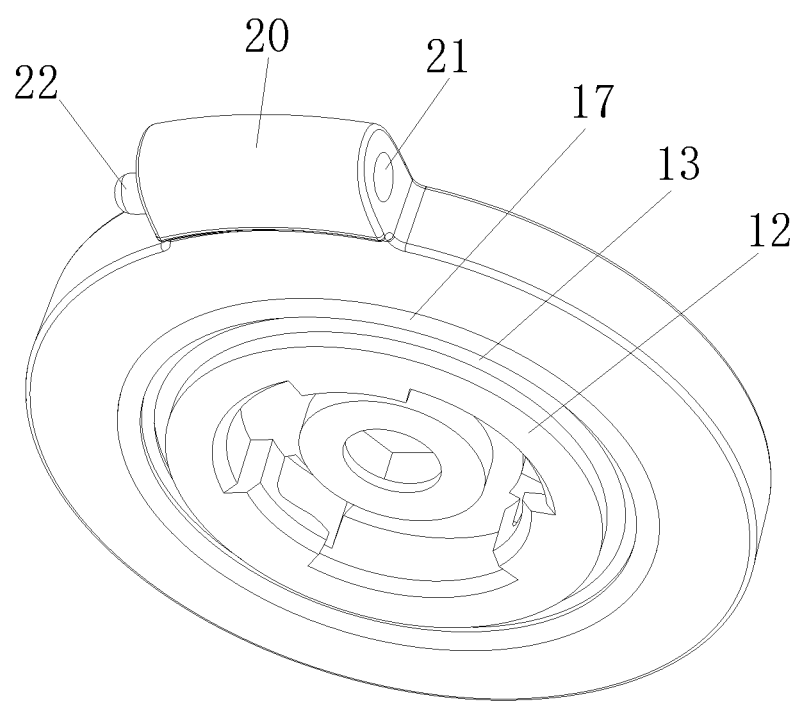
FIG. 4 illustrates a structural view of assembled fixing cover, wear ring and rotary ring in a protective case of a mobile terminal according to the present disclosure.

As a specific embodiment, referring to FIG. 3 and FIG. 4, the mounting portion further includes a wear ring 13, the wear ring 13 is sleeved on the connecting post and rotatably connected with the connecting post, the wear ring 13 is arranged between the base 8 and the fixing cover 9, and the rotary ring 10 is sleeved outside the wear ring 13 and rotatably connected with the wear ring 13. The wear ring 13 may be integrally and convexly formed on a circumferential surface of the connecting post; and preferably, the wear ring is integrally and convexly formed on a circumferential surface of the second extended portion 12. The wear ring 13 may also be integrally and convexly formed on an inner circumferential surface of the rotary ring 10. In the embodiment, as the ring assembly 2 includes the wear ring 13, the direct contact between the rotary ring 10 and the connecting post is avoided; and with the wear ring 13, the rotary ring 10 rotates more smoothly. Preferably, the wear ring 13 is sleeved on the second extended portion 12 and rotatably connected with the second extended portion 12.

As a specific embodiment, referring to FIG. 3 and FIG. 4, the rotary ring 10 includes a groove 15 with a second through hole 14 defined on a bottom of the groove, the rotary ring 10 is sleeved on the connecting post through the second through hole 14 and rotatably connected with the connecting post, and the fixing cover 9 is located in the groove 15. In the embodiment, as the rotary ring 10 includes the groove 15 with the second through hole 14 defined on the bottom of the groove and used for accommodating the fixing cover 9, the ring assembly 2 is merely as high as the metal ring 4, and the protective case reduces the height of the ring assembly 2, with the compact structure.

Figure 2:
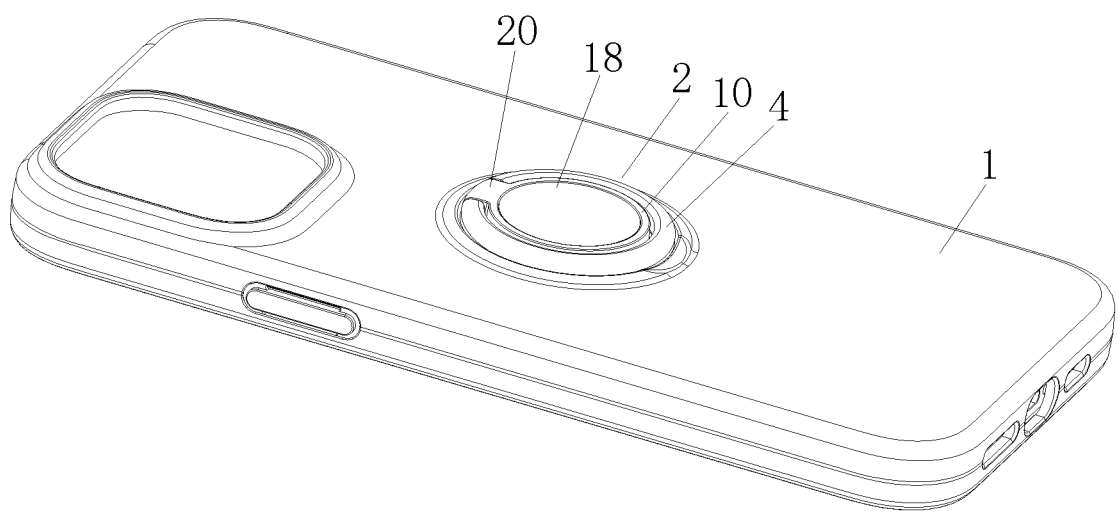
FIG. 2 illustrates a back view of a protective case of a mobile terminal according to the present disclosure.

As a specific embodiment, referring to FIG. 2, the top of the fixing cover 9 and the top of the rotary ring 10 are coplanar, and the top of the metal ring 4 and the top of the rotary ring 10 are coplanar.

As a specific embodiment, referring to FIG. 3 and FIG. 4, a side of the base 8 abutting against the rotary ring 10 is defined with an annular groove 16, and a side of the rotary ring 10 abutting against the base 8 is defined with an annular protrusion 17 matched with the annular groove 16. With such a technical solution, the rotating path of the rotary ring 10 is limited and the rotary ring 10 rotates more smoothly.

As a specific embodiment, referring to FIG. 2 and FIG. 3, a shielding layer 18 is defined on a top of the fixing cover 9. The shielding layer 18 may be a pattern layer on which the logos of the ring and shell can be drawn. In addition, during manufacture according to the embodiment of the present disclosure, multiple third through holes 19 may be formed in the base 8 and the fixing cover 9; and the shielding layer 18 can shield the third through holes 19 for an aesthetically pleasing appearance.

Figure 5:
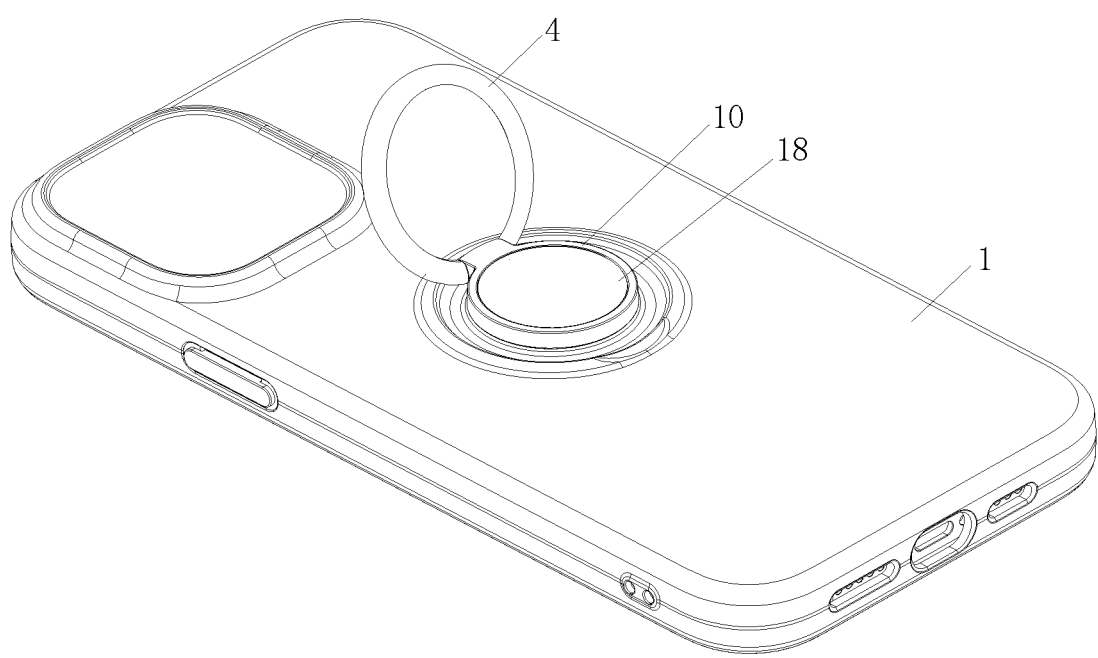
FIG. 5 illustrates a structural view of a ring body in an unfolded state in a protective case of a mobile terminal according to the present disclosure.

As a specific embodiment, referring to FIG. 2 and FIG. 5, the metal ring 4 rotates an angle of 0-120° relative to the rotary ring 10 for unfolding.

During specific implementation, a damping mechanism may be provided, such that when there is no external force or a small external force, the metal ring 4 rotating and unfolding for the designated angle relative to the rotary ring 10 can keep unchanged. With such a technical solution, the supporting angle can be adjusted by rotating the metal ring 4, to provide the convenience to watch videos and the like on the mobile phone, and omit the operation of holding the mobile phone with the hand.

As a specific embodiment, referring to FIG. 2 and FIG. 5, a lug 20 is provided at the outer edge of the rotary ring 10; two ends of the lug 20 are respectively defined with a first blind hole 21 and a limiting post 22; the lug 20, the fixing shaft 5 and the limiting post 22 are located at the nick 6; two end surfaces of the metal ring 4 are respectively defined with a second blind hole (not shown in the figures) and a third blind hole 23; two ends of the fixing shaft 5 are respectively stretched into the first blind hole 21 and the second blind hole; the limiting post 22 is stretched into the third blind hole 23; and the fixing shaft 5, the limiting post 22 and the metal ring 4 are connected through the lug 20 to form a closed ring.

In the embodiment of the present disclosure, the metal ring 4 and the fixing shaft 5 are made of metal materials, and other components are made of nonmetal materials such as plastic, so the structural strength and the service life of the ring mechanism are increased without affecting the wireless charging. The limiting post 22 is made of the nonmetal materials, such that after the ring mechanism is assembled, the metal ring 4 no longer forms the closed metal ring to affect the wireless charging on the cased mobile phone.

When the present disclosure is mounted, the base 8 is inserted into the first through hole 7 of the shell 1 and stretched to the backside of the shell 1, the rotary ring 10 and the metal ring 4 are assembled with the fixing shaft 5 to form an openable-closable rotating main body, the wear ring 13 is sleeved on the second extended portion 12 of the fixing cover 9 and the main body of the portion therefrom is sleeved on the openable-closable rotating main body, and the first extended portion 11 of the base 8 and the second extended portion 12 of the fixing cover 9 are aligned, connected and fixed; and as a result, the shell 1 is clamped between the base 8 and the fixing cover 9, and the ring assembly 2 can be firmly fixed in the shell 1, thereby completing the structural assembly.

Finally, it should be noted that the above embodiments are only intended to explain, rather than to limit, the technical solutions of the present disclosure. Although the present disclosure is described in detail with reference to the preferred embodiments, the person of ordinarily skill in the art should understand that modifications or equivalent substitutions made to the technical solutions of the present disclosure without departing from the tenet and scope of the technical solutions of the present disclosure should be included within the scope of the claims of the present disclosure.

What is claimed is:

1. A protective case for a mobile terminal, comprising a shell and a ring assembly, wherein the shell is defined with a mounting chamber for accommodating the mobile terminal;

the ring assembly comprises a metal ring and a mounting portion, the mounting portion is fixed on the shell, the metal ring is arranged on a side of the shell opposite to the mounting chamber, and the metal ring is pivotally connected with the mounting portion through a fixing shaft;

the metal ring and the fixing shaft are jointly formed into an annular body, and a nick is defined on the annular body;

a first through hole is formed in the shell, the mounting portion comprises a base, a fixing cover and a rotary ring, the base is located in the mounting chamber, the fixing cover is located on the backside of the shell, the base is defined with a first extended portion, the fixing cover is defined with a second extended portion, and the first extended portion passes through the first through hole to be fixedly connected with the second extended portion so as to form a connecting post;

the rotary ring is located between the shell and the fixing cover, the rotary ring is sleeved on the connecting post and rotatably connected with the connecting post, and the shell and the rotary ring are clamped between the base and the fixing cover; and the metal ring is connected to an outer edge of the rotary ring, an inner edge of the metal ring is matched with the outer edge of the rotary ring in shape, and the metal ring rotates relative to the rotary ring for unfolding.

2. The protective case according to claim 1, wherein the protective case has a maximum thickness of less than or equal to 4.8 mm, and the maximum thickness specifically refers to a distance between a bottom of the mounting chamber and a top of the ring assembly.

3. The protective case according to claim 1, wherein when the metal ring rotates to a position attached with the shell, the metal ring surrounds the mounting portion; the mounting portion is rotatably connected with the shell; and the mounting portion rotates relative to the shell around a first straight line, such that the metal ring rotates relative to the shell around the first straight line, and the first straight line is perpendicular to a backside of the shell.

4. The protective case according to claim 1, wherein the mounting portion further comprises a wear ring, the wear ring is sleeved on the connecting post and rotatably connected with the connecting post, the wear ring is arranged between the base and the fixing cover, and the rotary ring is sleeved outside the wear ring and rotatably connected with the wear ring.

5. The protective case according to claim 4, wherein the wear ring is sleeved on the second extended portion and rotatably connected with the second extended portion.

6. The protective case according to claim 1, wherein the rotary ring comprises a groove with a second through hole defined on a bottom of the groove, the rotary ring is sleeved on the connecting post through the second through hole and rotatably connected with the connecting post, and the fixing cover is located in the groove.

7. The protective case according to claim 1, wherein a side of the base abutting against the rotary ring is defined with an annular groove, and a side of the rotary ring abutting against the base is defined with an annular protrusion matched with the annular groove.

8. The protective case according to claim 1, wherein a shielding layer is defined on a top of the fixing cover.

9. The protective case according to claim 1, wherein a lug is provided at the outer edge of the rotary ring; two ends of the lug are respectively defined with a first blind hole and a limiting post; the lug, the fixing shaft and the limiting post are located at the nick; two end surfaces of the metal ring are respectively defined with a second blind hole and a third blind hole; two ends of the fixing shaft are respectively inserted into the first blind hole and the second blind hole; and an end of the limiting post away from the lug is inserted into the third blind hole.

* * * * *